(12) United States Patent
Das et al.

(10) Patent No.: US 9,177,048 B1
(45) Date of Patent: *Nov. 3, 2015

(54) COLLABORATIVE FILTERING (71) Applicants: Abhinandan S. Das, Sunnyvale, CA (US); Ashutosh Garg, Sunnyvale, CA (US); Mayur Dhondu Datar, Santa Clara, CA (US)

(72) Inventors: Abhinandan S. Das, Sunnyvale, CA (US); Ashutosh Garg, Sunnyvale, CA (US); Mayur Dhondu Datar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/851,092

(22) Filed: Mar. 26, 2013

Related U.S. Application Data (63) Continuation of application No. 13/347,377, filed on Jan. 10, 2012, now Pat. No. 8,407,219, which is a continuation of application No. 11/676,264, filed on Feb. 16, 2007, now Pat. No. 8,135,718.

(51) Int. Cl.
*G06F 17/30* (2006.01)

(52) U.S. Cl.
CPC .... *G06F 17/30699* (2013.01); *G06F 17/30598* (2013.01)

(58) Field of Classification Search
CPC .................................. G06F 17/30699
USPC ........................................ 707/732
See application file for complete search history.

(56) References Cited

U.S. PATENT DOCUMENTS

| | | | |
|---|---|---|---|
| 6,006,218 A * | 12/1999 | Breese et al. | |
| 6,078,740 A | 6/2000 | DeTreville | |
| 6,519,591 B1 | 2/2003 | Cereghini et al. | |
| 6,556,960 B1 | 4/2003 | Bishop et al. | |
| 6,687,696 B2 | 2/2004 | Hofmann et al. | |
| 6,728,695 B1 | 4/2004 | Pathria et al. | |
| 6,981,040 B1 | 12/2005 | Konig et al. | |
| 7,113,185 B2 | 9/2006 | Jojic et al. | |
| 7,328,216 B2 | 2/2008 | Hofmann et al. | |
| 7,389,201 B2 | 6/2008 | Chickering et al. | |
| 7,685,276 B2 | 3/2010 | Konig et al. | |
| 8,065,254 B1 | 11/2011 | Das et al. | |

(Continued)

OTHER PUBLICATIONS

Adomavicius, G., and Tuzhilin, A. 'Toward the Next Generation of Recommender Systems: A survey of the State-of-the-Art and Possible Extensions.' IEEE Transactions on Knowledge and Data Engineering, vol. 17, N.6, Jun. 2005.

(Continued)

*Primary Examiner* — William Spieler
(74) *Attorney, Agent, or Firm* — Fish & Richardson P.C.

(57) ABSTRACT

Systems, methods, and apparatus, including computer program products, for collaborative filtering are provided. A method is provided. The method includes clustering a plurality of entities with respect to one or more latent variables in a probability distribution model of a relationship between a set of entities and a set of items, the probability distribution model comprising a probability distribution of the set of items with respect to the latent variables. The method also includes, as new items are added to the set of items, updating the probability distribution of the set of the items with respect to the latent variables, and generating an updated relationship score for an entity with respect to the set of items based on the entity's fractional membership in the clustering with respect to the latent variables and based on the updated probability distribution of the set of the items with respect to the latent variables.

19 Claims, 7 Drawing Sheets

(56) References Cited

U.S. PATENT DOCUMENTS

| | | | |
|---|---|---|---|
| 8,135,718 | B1 | 3/2012 | Das et al. |
| 8,374,985 | B1 | 2/2013 | Das et al. |
| 8,407,219 | B1 | 3/2013 | Das et al. |
| 8,407,226 | B1 | 3/2013 | Das et al. |
| 2004/0034652 | A1* | 2/2004 | Hofmann et al. ............ 707/102 |
| 2004/0172267 | A1* | 9/2004 | Patel et al. ........................ 705/1 |
| 2007/0038659 | A1 | 2/2007 | Datar et al. |

OTHER PUBLICATIONS

Blei, D.; Ng, A.; and Jordan, M. 'Latent Dirichlet Allocation.' In Journal of Machine Learning Research, 2003.

Breese, J.; Heckermann, D.; and Kadie, C. 'Empirical Analysis of Predictive Algorithms for Collaborative Filtering.' Proc. of the 14th Conf. on Uncertainty in Artificial Intelligence, Jul. 1998.

Broder, A. 'On the resemblance and containment of documents.' Compression and Complexity of Sequences (Sequences '97), 1998 pp. 21-29.

Buhler, J. 'Efficient large-scale sequence comparison by locality-sensitive hashing.' Bioinformatics, vol. 17, pp. 419-428, 2001.

Charikar, M. Similarity Estimation Techniques from Rounding Algorithms. Proc. of the 34th Annual ACM Symposium on Theory of Computing, STOC (2002).

Chang, et al., 'Bigtable: A Distributed Storage System for Structured Data,' 2006, Usenix Association, 14 pages.

Cohen, E. 'Size-Estimation Framework with Applications to Transitive Closure and Reachability.' Journal of Computer and System Sciences 55 (1997): 441-453.

Cohen, et al. 'Finding Interesting Associations without Support Pruning.' Proc. of the 16th Intl. Conf. on Data Engineering, (ICDE 2000).

Cristianiti, N., and Shawe-Taylor, J. 'An Introduction to Support Vector Machines and Other Kernel-based Learning Methods.' Cambridge University Press, 1st edition (Mar. 28, 2000).

Das et al., 'Google News Personalization: Scalable Online Collaborative Filtering,' WWW2007, May 8-12, 2007, Banff, Canada, 10 pages.

Datar, et al. 'Locality-Sensitive Hashing Scheme Based on P-Stable Distributions.' Proc. of the 20th ACM Annual Symposium on Computational Geometry (SOCG 2004).

Dean, et al., 'MapReduce: Simplified Data Processing on Large Clusters,' 2004, OSDI, 13 pages.

Gionis, A., et al. 'Similarity Search in High Dimensions via Hashing.' Proc. of the 25th Intl. Conf. on Very Large Data Bases, VLDB (1999).

Hofmann, 'Latent Semantic Models for Collaborative Filtering,' Jan. 2004, ACM, 27 pages.

Heckerman, et al., Dependency Networks for Inference, Collaborative Filtering, and Data Visualization., Journal of Machine Learning Research., Oct. 2000, pp. 49-75.

Indyk, P. 'A Small Approximately Min-Wise Independent Family of Hash Functions.' Proc. 10th Symposium on Discrete Algorithms, SODA (1999).

Indyk, P, and Motwani, R. Approximate Nearest Neighbor: Towards Removing the Curse of Dimensionality. Proc of the 30th Annual ACM Symposium on Theory on Computing, 1998, pp. 604-613.

Marlin, B., and Zemel, R. 'The Multiple Multiplicative Factor Model for Collaborative Filtering.' ACM Intl. Conf. Proceeding Series, vol. 69, 2004.

Motwani, R. and Raghavan, P. Randomized Algorithms. Cambridge University Press, 1985.

Resnick, et al. 'GroupLens: an Open architecture for Collaborative Filtering of Netnews.' Proc. of Computer Supported Cooperative Work Conf., 1994.

Sarwar, et al. 'Application of Dimensionality Reduction in Recommender Systems—A Case Study.' Proc. of the ACM WebKDD Workshop, 2000.

Sarwar, et al. 'Item-Based Collaborative Filtering Recommendation Algorithms.' Proc. of the 10th Intl. WWW Conf. , (WWW) 2001.

Shani, et al. 'An MDP-Based Recommender System.' Proc. of the 18th Conf. Uncertainty in Artificial Intelligence, Aug. 2002.

Yu, et al. 'Instance Selection Techniques for Memory-Based Collaborative Filtering.' Proc. of the Second Siam Intl. Conf. on Data Mining, (SDM) 2002.

\* cited by examiner

COLLABORATIVE FILTERING

This application is a continuation application of, and claims priority to, U.S. patent application Ser. No. 13/347,377, entitled "Collaborative Filtering", which was filed on Jan. 10, 2012, which is a continuation of U.S. patent application Ser. No. 11/676,264, entitled "Collaborative Filtering," which was filed on Feb. 16, 2007. The disclosure of each of these applications is incorporated herein by reference in their entirety.

BACKGROUND

This specification relates to collaborative filtering in recommender systems.

Recommender systems attempt to predict which items from a set of items a user may be interested in. One or more of the predicted items are then presented as recommendations to the user. For example, a content provider can present recommendations automatically or can present recommendations in response to a user request (e.g., over the Web). The recommender system predicts the items using information about the user, for example, from a profile of the user or from items in which the user has previously expressed interest.

Collaborative filtering is one technique used to predict items in which a user may be interested. Collaborative filtering models user preferences using community data. The community data includes, for example, interests and behaviors of a set of users. Generally, these models are built using static user and item sets. Periodically, the model is rebuilt to account for changes in the user set (e.g., addition or removal of users) and the item set (e.g., addition or removal of items).

SUMMARY

Systems, methods, and apparatus, including computer program products, for collaborative filtering are provided. In general, in one aspect, a computer-implemented method is provided. The method includes clustering a plurality of entities with respect to one or more latent variables in a probability distribution model of a relationship between a set of entities and a set of items, the probability distribution model comprising a probability distribution of the set of items with respect to the latent variables. The method also includes, as new items are added to the set of items, updating the probability distribution of the set of the items with respect to the latent variables, and generating an updated relationship score for an entity with respect to the set of items based on the entity's fractional membership in the clustering with respect to the latent variables and based on the updated probability distribution of the set of the items with respect to the latent variables. Other embodiments of this aspect include corresponding systems, apparatus, computer readable media, and computer program products.

In general, in one aspect, a computer-implemented method is provided. The method includes identifying data including a set of users that includes as members a plurality of users and a set of items that includes as members a plurality of user selectable items and calculating an initial overall probability distribution using the set of users, the set of items, and a set of categories representing latent variables, where the overall probability distribution including a first probability distribution relating the set of users and the set of categories and a second probability distribution relating the set of items and the set of categories. The method also includes determining a new second probability distribution relating an updated set of items and the set of categories using selection data relating item selections from users of the set of users and the categories associated with the users, calculating an overall probability distribution relating users of the set of users and items of the updated set of items using the first probability distribution and the new second probability distribution, and using the overall probability distribution to recommend one or more items. Other embodiments of this aspect include corresponding systems, apparatus, computer readable media, and computer program products.

Particular embodiments of the subject matter described in this specification can be implemented to realize one or more of the following advantages. A probability distribution model can be built for large data sets using a distributed set of machines. A system can recommend items to a user when items in an item set change frequently. The recommended items can include items recently added to the item set without rebuilding the entire model. The system can recommend relevant items by discounting older items relative to newer items.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
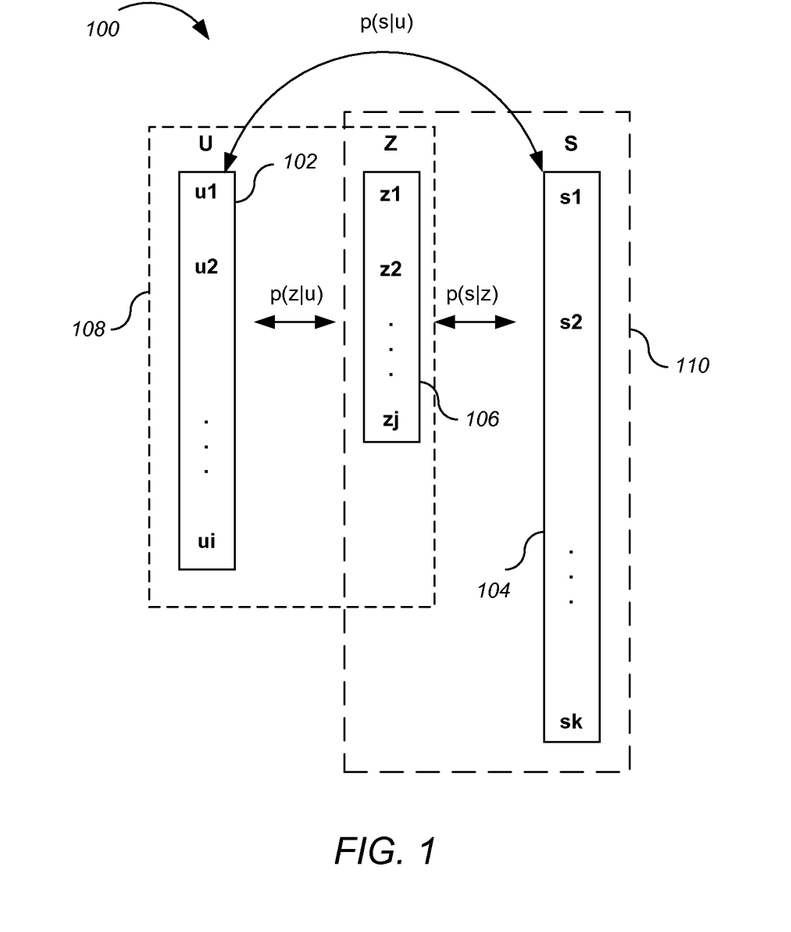
FIG. 1 is a block diagram illustrating a probability distribution model relating items, users, and latent variables.

FIG. 1 is a block diagram illustrating a probability distribution model 100 relating items, users, and latent variables, for example, a probabilistic latent semantic indexing ("PLSI") model. The probability distribution model 100 is used to perform collaborative filtering. The probability distribution model 100 models users and items as random variables, taking values from the space of all possible users and items respectively. The relationship between users and items is learned by modeling a joint distribution of users and items as a mixture distribution. In some implementations, other types of sets are used. For example, instead of users and items, the probability distribution model 100 can model entities and items as random variables.

FIG. 1 shows a user set 102 and an item set 104. The user set 102 includes a number of distinct users, $U=\{u_1, u_2, \ldots, u_n\}$. The item set 104 includes a number of distinct user-selectable items, $S=\{s_1, s_2, \ldots, s_m\}$. The item set 104 can include, for example, a set of documents (e.g., news stories), videos, audio files, web pages, and commercial items (e.g., books or other items for sale). The user set 102 and the item set 104 can be very large. For example, in a news system (e.g., Google™ News) the item set 104 can include a number of individual news stories collected and updated from a variety of news sources. The number of distinct news stories in the item set 104 can number in the millions. Similarly, the number of distinct users who can select the news stories can also number in the millions.

The membership of the user set 102 can change. For example, each individual user can be associated with a user profile. Membership of the user set 102 can change as user profiles are added or deleted. Additionally, the membership of the item set 104 can also change. New items can be added and old items removed. For example, for an item set 104 including news stories, new items can be added to the item set frequently (e.g., every few minutes).

To predict items, the recommender system identifies an overall probability distribution relating the items given users, p(s|u). Thus, the probability distribution can be used to identify a probability that a particular item of the item set 104 will be of interest to a particular user of the user set 102.

FIG. 1 also shows a set of categories 106. The set of categories 106 includes a number of distinct categories, $Z=\{z_1, z_2, \ldots, z_k\}$. In some implementations, the number of member categories in the category set 106 is substantially less than the number of users and items in the user set 102 and item set 104, respectively. For example, in the news story example above, the number of categories can be on the order of thousands relative to millions of items.

The members of the set of categories can be explicitly defined or they can be derived as latent variables (also called hidden variables). A latent variable is a variable that is not directly observable. The latent variables are instead inferred from observable variables. In particular, they are inferred from the user set and the item set. For example, the relationship between users and items can be captured using the latent variables. Thus, the latent variables can be though of as representing user communities (e.g., like-minded users) and item communities (e.g., genres). The latent variable has states z (e.g., categories) for user-item pairs, so that users and items are conditionally independent. The particular state of the latent variable Z for a particular user item pair (u, s), models a latent cause for selecting s. Each state z offers an explanation for a relationship that is not directly observable (e.g., a user selected an item because of z).

Additionally, the number of states z is assumed to be finite and of size j. Generally, latent variables reduce the dimensionality of data. Thus, large sets of observable variables (e.g., users and items) are aggregated (i.e., clustered into categories) to represent an underlying concept. The number of latent variable states can be controlled depending on a desired level of granularity in relating users and interests to the latent variables. For example, if j=1 (only one state of the latent variable), the probability of selecting a particular item does not depend on the user. Thus, the probability of an item given users, p(s|u), is equal to just the non-conditional probability of the item, p(s). The number of latent variables can be increased until the probability distribution model is able to represent any probability mass function over (u, s) pairs. Additional description of latent variables and latent semantic models generally is found in Hoffmann, *Latent Semantic Models for Collaborative Filtering*, ACM Transactions on Information Systems, 2004, Vol. 22(1), pp 89-115, which is incorporated by reference.

As shown in FIG. 1, a first probability distribution 108 describes the probability of categories given users, p(z|u). The categories cluster groups of users and the first probability distribution represents the probability that a particular category has particular users as members.

A user can be a member of more than one category. For example, the categories can represent different user communities. The user community membership can be inferred from user interests. User interests can be identified in a variety of ways. In some implementations, users can specify one or more area of interest (e.g., for particular items or types of items). A user can indicate interest in particular genres (e.g., as part of a user profile). As a result, users can be grouped with other users as members of categories representing the users' interests.

In other implementations, the system infers category membership based on user behavior including the user's selection history (e.g., click history). The user's history of selecting particular items can be indicative of particular categories. For example, the user's past news story selections can be used to identify news categories (e.g., top stories, national news, and business news) to associate with the user.

A second probability distribution 110 describes the probability of items with respect to categories, p(s|z). The second probability distribution identifies the probability that a particular item will be selected by a user in a particular category. An item may be more likely to be selected for users belonging to one category relative to another. For example, the selection of an action movie item is more likely given the action category than the drama category. Selecting the item can include clicking on an item to view (e.g., a news story) as well as selecting an item for purchase (e.g., a book or an audio file).

The first probability distribution 108 and the second probability distribution 110 are combined in the probability distribution model 100 to determine an overall probability distribution, p(s|u), identifying the probability of items given users. The overall probability distribution, is intended to indicate the probability of a given user selecting a particular item. Thus, the overall probability distribution can be used to recommend items to particular users.

The probability distribution model 100 for the overall probability distribution, p(s|u) can be describes by the equation:

$$p(s \mid u; \theta) = \sum_{i=1}^{j} p(z_i \mid u) p(s \mid z_i)$$

where $\theta$ is a parameter vector representing conditional probability distributions p(z|u) and p(s|z). The probability distribution model 100 uses the latent variable Z to make users and items conditionally independent. The probability distribution model 100 can also represent a generative model. In the generative model, state z of the latent variable Z is chosen for an arbitrary user, u, based on the first probability distribution, p(z|u). Next, and item, s, is sampled based on the chosen z from the second probability distribution, p(s|z).

The probability distribution model is learned using training data to estimate the first and second probability distributions such that the product of the conditional likelihood over all data points is maximized. The training data includes historical event data representing observed (user, item) pairs (e.g., pairs identifying a particular item selected by a particular user). The probability distributions are estimated to minimize the empirical logarithmic loss, described by:

$$L(\theta) = -\frac{1}{T} \sum_{i=1}^{T} \log(p(s_t \mid u_t; \theta))$$

where $L(\theta)$ is the logarithmic loss, and T is the size of the training data. A low logarithmic loss indicates a high confidence in the accuracy of the estimated probability distributions.

The logarithmic loss can be minimized using an expectation-maximization ("EM") algorithm. The EM algorithm is used to calculate maximum likelihood estimates of parameters in probabilistic models using latent variables. The EM algorithm is a two-step process. An expectation step calculates an expectation of the likelihood by including the latent variables as if they were observed. A maximization step calculates the maximum likelihood estimates by maximizing the expected likelihood calculated in the expectation step. The process iterates between expectation and maximization steps where parameters calculated in the maximization step are used for a next expectation step. The EM algorithm describes a class of related algorithms: the expectation and maximization steps provide a roadmap for developing specific EM algorithms. In some implementations, other techniques are used to find maximum likelihood estimates other than the EM algorithm, for example, gradient descent or conjugate gradient techniques.

The EM algorithm first specifies a complete model that treats the latent variables as if they were actually observed. Thus, for every observed user item pair, (u, s), (e.g., from the training data) there is an assumed observed triplet, (u, s, z).

The states z of the latent variable Z are not known. Therefore, a variational probability distribution, $q(z; u, s)$ is introduced for every observed user item pair. The Q distribution models the latent variable states z given the current parameters $\theta$. Consequently, $q(z; u, s)$ denotes the probability the selection of an item by a user is attributed to the user being a member of a category z (also referred to as the co-occurrence of (u, s)).

In the expectation step, the Q variables are calculated for given parameters. Thus, the expectation step calculates the optimal Q (denoted by q*) for given parameters $\hat{\theta}$. The Q variables are calculated as the posterior probabilities (the posterior probability is the conditional probability assigned to a random event in view of observed evidence) of the latent variables as shown by:

$$q*(z; u, s; \hat{\theta}) = p(z \mid u, s; \hat{\theta}) = \frac{\hat{p}(s \mid z)\hat{p}(z \mid u)}{\sum_{z \in Z} \hat{p}(s \mid z)\hat{p}(z \mid u)}$$

The hat (^) on the probabilities denotes quantities parameterized by $\hat{\theta}$. Thus, these probabilities represent parameter estimates from a previous iteration of the EM algorithm, which are replaced with each iteration calculating q*. Initially (i.e., for the first iteration), the probabilities can be randomly assigned values.

The maximization step uses the Q function to compute $p(z|u)$ and $p(s|z)$ as:

$$p(z \mid u) = \frac{\sum_s q*(z; u, s; \hat{\theta})}{\sum_z \sum_s q*(z; u, s; \hat{\theta})}, \text{ and}$$

$$p(s \mid z) = \frac{\sum_u q*(z; u, s; \hat{\theta})}{\sum_s \sum_u q*(z; u, s; \hat{\theta})}$$

The calculated probability distributions, $p(z|u)$ and $p(s|z)$, are used to calculate the overall probability distribution, $p(s|u)$, which is used to calculate the logarithmic loss as described above. In the EM algorithm, these values are also plugged back into the equation for q* as the "hat" probability distributions to begin a next iteration of the EM algorithm. The iterations can continue, for example, until the logarithmic loss substantially converges. In other implementations, a specified number of iterations are executed. Alternatively, the iterations continue until the change in the logarithmic loss is less than a specified threshold value. Consequently, values for first probability distribution, $p(s|z)$, and the second probability distribution, $p(z|u)$, and therefore the overall probability distribution $p(s|u)$, are modeled such that they can be used in the probability distribution model 100 to recommend items to users.

Generally, the EM algorithm is executed with all model data in memory. However, when dealing with very large data sets (e.g., very large user and item sets), using a single machine becomes computationally infeasible. Therefore, a parallelization process can be used to assign portions of the EM algorithm calculations to different machines.

Figure 2:
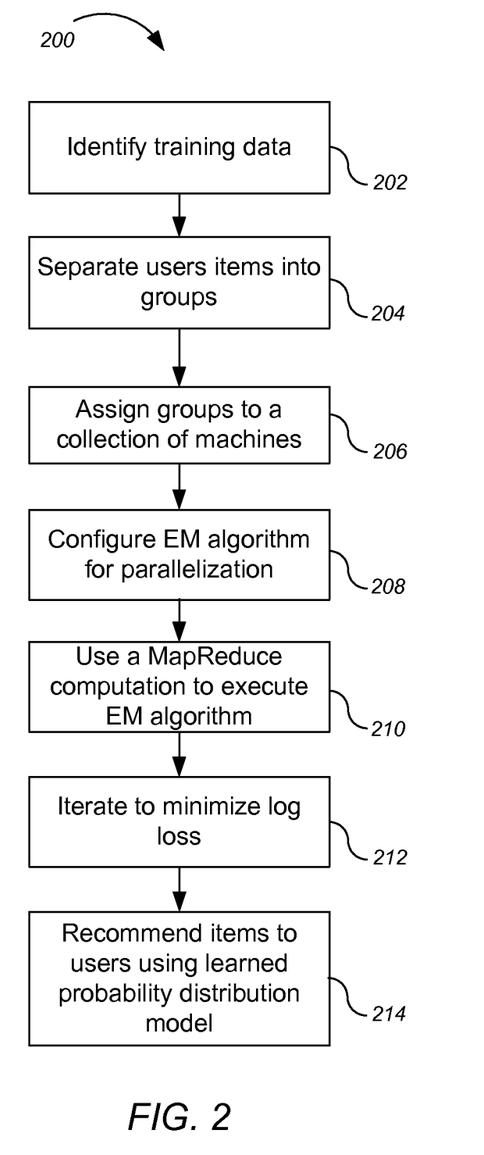
FIG. 2 is a flowchart illustrating an example method 200 for executing the EM algorithm on multiple machines.

FIG. 2 is a flowchart illustrating an example method 200 for executing the EM algorithm on multiple machines. For convenience, the method 200 will be described with reference to a computer system that performs the method (e.g., a recommender system).

The system identifies training data of size T (step 202). The training data can include a user set, and item set, and event data of observed user-item pairs (u, s). For example, the event data can be click data of user selections of particular items. The event data includes historical data of the selection of items by members of the user set over a specified period of time (e.g., a period of days, weeks, or months).

The system separates the users and items into groups (step 204). The user set and the item set are each divided, or sharded, into a specified number of groups. Each user group includes a specified number of users from the user set. Each item group includes a specified number of items from the item set. For example, the user set $U=\{u_1, u_2, u_i\}$ can be sharded into groups $U_1, U_2, \ldots, U_R$ where the user group $U_1=\{u_1, u_2, \ldots, u_n\}$, where n<i. In some implementations, each user group includes a substantially equal number of users. For example, for a user set where i=10 million members, the user set can be divided into 1,000 user groups with each user group having 10,000 users. Similarly, the item set $S=\{s_1, s_2, \ldots, s_k\}$, can be sharded into item groups $S_1, S_2, \ldots, S_L$ where the item group $S1=\{s_1, s_2, \ldots, s_m\}$, where m<k. In some implementations, each item group includes a substantially equal number of items.

The system assigns the respective user and item groups to a collection of machines (step 206). Each machine receives a user group and an item group. Additionally, each machine receives the event data corresponding to the users and item pairs from the assigned groups. For example, if a machine is assigned a user group including users 1-100 and an item group including items 201-300, the machine also receives all event data where users 1-100 selected items 201-300. Similarly, if another machine is assigned a user group including users 201-300 and an item group including items 1-100, the machine also receives all event date where users 201-300 selected items 1-100.

Figure 3:
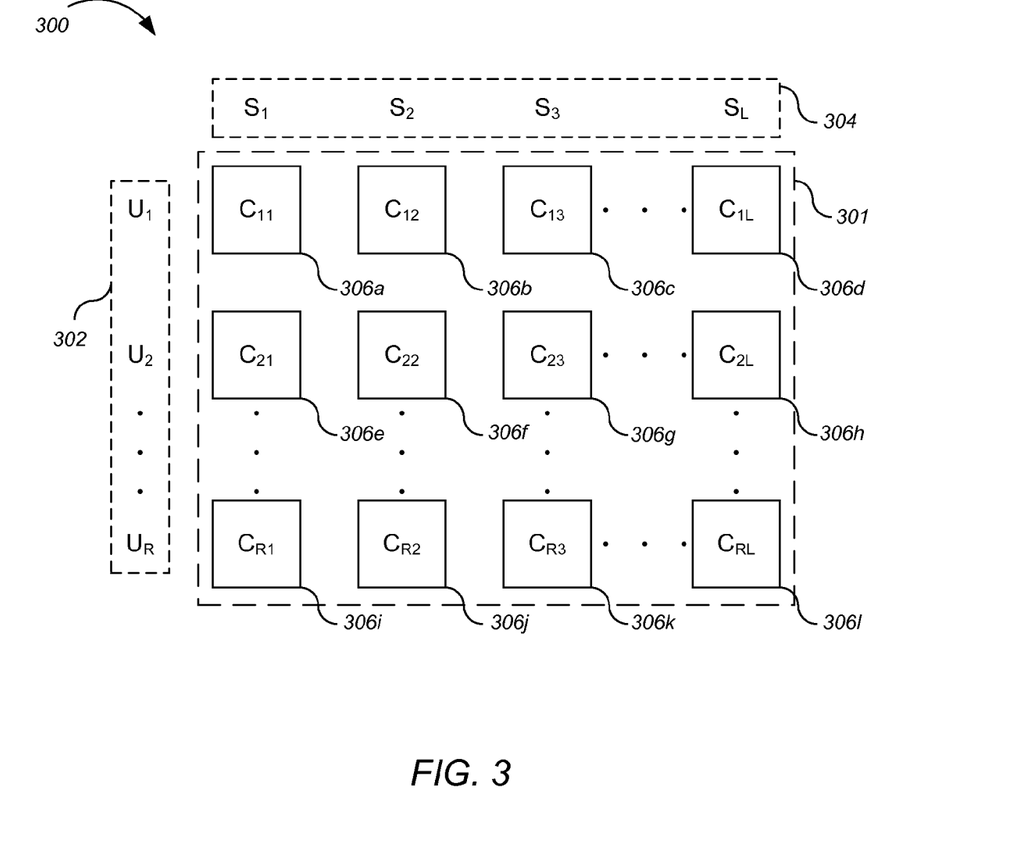
FIG. 3 shows a block diagram 300 illustrating a collection of machines 301 for assigned groups.

FIG. 3 shows a block diagram 300 illustrating a collection of machines 301 for assigned groups. The collection of machines 301 includes, for example, a collection of individual computers, processors, or other device that can perform calculations. The collection of machines 301 includes a grid of R×L machines 306a-306l. Each machine is assigned a user group from the user groups 302 and an item group from the item groups 306. For example, machine 306g receives user group $U_2$ and item group $S_3$ along with event data relating selections of the users of user group $U_2$ of items in item group $S_3$.

The EM algorithm is configured for parallelization (step 208). To configure the EM algorithm for parallelization, the Q function described above is rewritten as follows:

$$q*(z; u, s; \hat{\theta}) = p(z | u, s; \hat{\theta}) = \frac{\frac{N(z, s)}{N(z)} \hat{p}(z|u)}{\sum_{z \in Z} \frac{N(z, s)}{N(z)} \hat{p}(z|u)}$$

where, $$N(z, s) = \sum_u q*(z; u, s; \hat{\theta}),$$

$$N(z) = \sum_s \sum_u q*(z; u, s; \hat{\theta}), \text{ and}$$

$$\hat{p}(z|u) = \frac{\sum_s q*(z; u, s; \hat{\theta})}{\sum_z \sum_s q*(z; u, s; \hat{\theta})}$$

Consequently, $q*(z;u,s;\hat{\theta})$ can be calculated using the N(z, s), N(z), and $\hat{p}(z|u)$ statistics. Furthermore, $q*(z;u,s;\hat{\theta})$ can be calculated independently and in parallel for every user-item pair, (u, s), observed in the event data. Thus, for example, $q*(z;u,s;\hat{\theta})$ can be calculated independently for a user group and an item group assigned to a particular machine of the collection of machines.

The system uses a MapReduce computation to execute EM algorithm on the collection of machines (step 210). In other implementations, a different parallelization technique can be used to perform the likelihood estimations. MapReduce describes both a programming model and an implementation of the model for processing and generating large data sets. The model and its library implementation will both be referred to as MapReduce. Using MapReduce, programmers specify a map function that processes input (key, value) pairs to generate a set of intermediate (key, value) pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

A MapReduce computation takes a set of input (key, value) pairs, and produces a set of output (key, value) pairs. The user expresses the computation as two functions: Map and Reduce.

Map, written, e.g., by a programmer, takes an input (key, value) pair and produces a set of intermediate (key, value) pairs. The MapReduce library groups together all intermediate values associated with the same intermediate key I and passes them to the Reduce function.

The Reduce function, also written, e.g., by a programmer, accepts an intermediate key I and a set of values for that key. It merges together these values to form a possibly smaller set of values. Typically just zero or one output value is produced for each Reduce invocation. The intermediate values are supplied to the user's reduce function through an iterator. In this way lists of values that are too large to fit in memory can be handled. Additional details of MapReduce are described below.

In particular, two or more machines of the collection of machine perform the map function. The (i, j)th machine of the collection of machines loads conditional probability distributions and statistics corresponding to the users in the ith shard and items in the jth shard, respectively. Thus, each individual machine only need load a fraction of the user and item statistics. The map function calculates $q*(z;u,s;\hat{\theta})$ for the user and item data corresponding to each machine and outputs three intermediate (key, value) pairs: (u, q*), (s, q*), and (z, q*).

During the Reduce function, three reduce machines receive the corresponding (key, value) pairs from each mapper machine. A first reduce machine receives the (key, value) pairs corresponding to the key s and computes N(z, s) for all z values. The output (key, value) pair from the first reduce machine is: (s,N(z,s)). A second reduce machine receives the intermediate (key, value) pairs corresponding to the key u and computes $\hat{p}(z|u)$. Thus, the output (key, value) pair from the second reduce machine is: (u,$\hat{p}(z|u)$). Finally, a third reduce machine receives the (key, value) pairs corresponding to the key z and computes N(z). Thus, the output (key, value) pair from the third reduce machine is:

$$\left(z, N(z) = \sum_s \sum_u q*(z; u, s; \hat{\theta})\right).$$

The system iterates to minimize logarithmic loss (step 212). The output values from the reduce machines are used for the next EM iteration. Each set of output values are used to calculate the first probability distribution, p(z|u), and second probability distribution, p(s|z), used to calculate an overall probability distribution p(s|u). The overall probability distribution, p(s|u), is used to calculate the logarithmic loss described above. As described above, the iterations of the EM algorithm can continue until the logarithmic loss is minimized. Alternatively, a specified number of iterations can be computed. Finally, the iterations can continue until the change in the logarithmic loss is less than a specified threshold amount.

Once the iterations are complete, the probability distribution model has been learned and can be used to recommend items to users (step 214). For example, for a given user, the probability distribution model can recommend particular items from the item set that the user is likely to be interested in.

Figure 4:
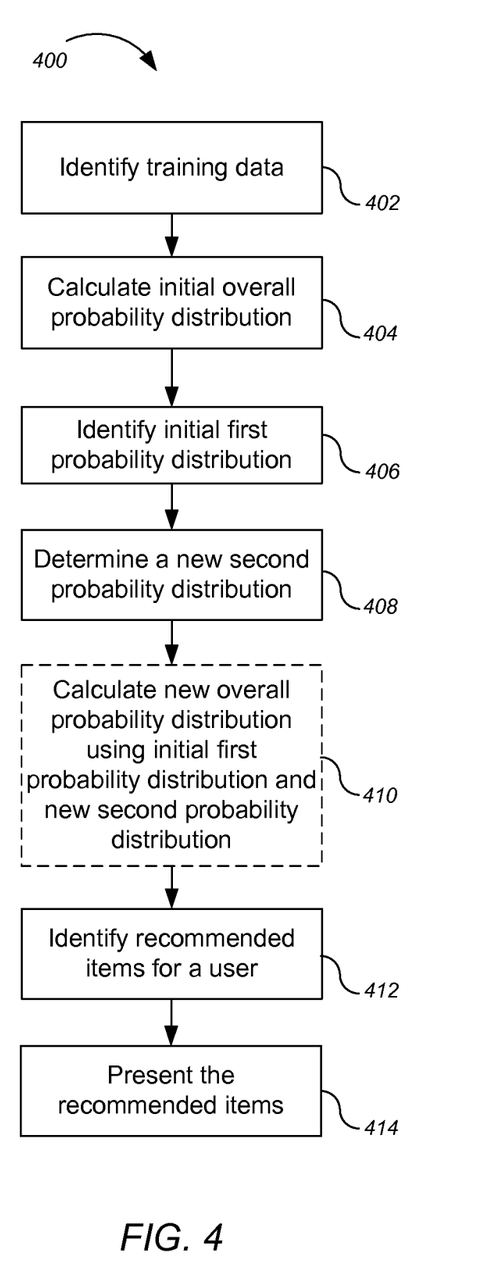
FIG. 4 is a flowchart illustrating an example method for recommending items to a user.

FIG. 4 is a flowchart illustrating an example method 400 for recommending items to a user. For convenience, the method 400 will be described with reference to a computer system that performs the method (e.g., a recommender system). The system identifies training data (step 402). The training data includes a set of users, a set of items, and event histories for (user, item) pairs. The set of users includes as members a number of distinct users. For example, each user can be associated with a user profile maintained by the system. The profile can identify user interests. Additionally, or alternatively, the profile can be used to track user behavior.

Alternatively, the system can track the interests and/or behavior of distinct users using other techniques, for example, by monitoring behavior from particular IP addresses or using data previously stored on a user's device (e.g., a "cookie") to identify individual users of the system.

In some implementations, the user creates a particular user identifier to uniquely identify the user in the system. The user can logon to access particular features (e.g., to select or purchase particular items) as well as to receive item recommendations. The membership of the user set can change with the addition of new users (e.g., newly created user profiles) and the removal of other users.

The item set includes as members a number of distinct items, for example, documents (e.g., news stories), video content, audio content, and consumer items (e.g., books). The members of the item set can change with the addition of new items or removal of old items, which is referred to as item churn. The item churn can frequently change the membership of the item set. The rate of item churn can vary, for example, depending on the types of items in the item set. For example, news stories can be added every few minutes or more frequently, and the rate of item churn is high. By contrast, the addition or removal of other items (e.g., books and other consumer items), can be less frequent (e.g., daily, weekly), in which case the rate of item churn is low.

The training data is used to generate an initial probability distribution model relating users and items from the user set and item set, respectively (step 404).

The initial probability distribution model is generated, for example, as described in reference to FIG. 2. The training data is evaluated, e.g., using the EM algorithm, to calculate an initial overall probability distribution, $p(s|u)$, as the product of an initial first probability distribution, $p(z|u)$, and an initial second probability distribution, $p(s|z)$. The overall probability distribution can be generated periodically. The frequency of determining the overall probability distribution can be specified, for example, according to the rate of change in the user set, since changes in the user set can change the first probability distribution. For example, the overall probability distribution can be determined daily or weekly to adjust for new users or deleted user in the user set.

The system identifies the first probability distribution from the initial probability distribution model (step 406). The first probability distribution, $p(z|u)$, relates the user set and the set of categories. In particular, the first probability distribution identifies the probability of a particular category given a user. The first probability distribution, $p(z|u)$, can be determined from the EM algorithm such that the logarithmic loss is minimized. Once determined, the first probability distribution can be considered effectively static.

The system determines a new second probability distribution (step 408). The new second probability distribution, $p(s|z)$, relates the set of categories and the item set using current user-item event data. As with the second probability distribution described above, the new second probability distribution identifies the probability that a particular item will be selected given a particular category. Therefore, the new second probability distribution can be used to identify which items are likely to be selected by a user given that the user is a member of one or more particular categories.

Figure 5:
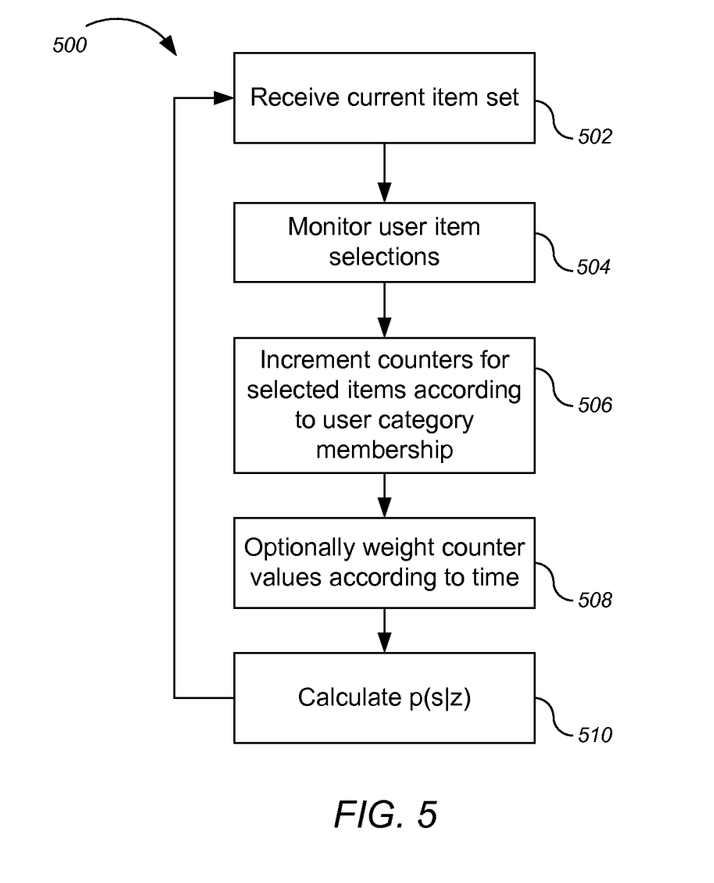
FIG. 5 is a flowchart illustrating an example method for determining a second probability distribution.

FIG. 5 is a flowchart illustrating an example method 500 for determining the new second probability distribution, $p(s|z)$. For convenience, the method 500 will be described with reference to a computer system that performs the method.

The system receives the current item set (step 502). For example, the system can retrieve or request an updated item set. The current item set includes the most recently added or removed items. For example, if the items are news stories, the current item set includes news stories added to the item set. Thus, some items may have been added to the item set within a few minutes. Consequently, when determining the second probability distribution, the current item set should be received in order to use the most up to date item set.

The system monitors user item selections (step 504). Thus, the system identifies each selection of an item by a user of the user set (e.g., user click data). For example, if a user selects a news story item, the system identifies which news story item was selected and by which user.

The system increments one or more counters for selected items according to the user category membership (step 506). Each item has a number of associated counters. The number of counters is equal to the number of categories. When a particular item is selected, its counters are incremented fractionally according to the member categories of the user that selected the item. For example, a user $u_1$ selects an item $s_1$. User $u_1$ is also a member of categories $z_2$ and $z_4$. As a result the counters for item $s_1$ corresponding to categories $z_2$ and $z_4$ are incremented. In some implementations, the sum of the counter increments for the item selection is equal to 1. Thus, the count of 1 is divided among the member categories. For example, the counter corresponding to category $z_2$ is incremented by 0.5 and the counter corresponding to category $z_4$ is incremented by 0.5. The respective counters can be incremented according to the membership ratio identified by the first probability distribution $p(z|u)$ (e.g., a user that has a higher probability associate with category $z_2$ compared with category $z_4$ can result in counter $z_2$ incremented by 0.8 and counter $z_4$ incremented by 0.2, respectively). In some implementations, counts of user selections on items are normalized across the set of items.

The system optionally weights counter values according to time (step 508). For example, each increment to a counter can be associated with a timestamp. In some implementations, a weight function is applied to the counter value according to elapsed time such that older counter increments are discounted by greater amounts with elapsed time.

In other implementations, time benchmarks are used to discount the values of counter increments. For example, increments received from a present time to time $t_1$ can be unchanged. Counter increments received from time $t_1$ to time $t_2$ can be discounted by a first multiplier (e.g., 0.5). Counter increments received from time $t_2$ to time $t_3$ can be discounted by an additional multiplier (e.g., 0.5×0.5). Consequently, older user selections have less impact on the particular counter value for an item.

In some implementations, increments to a counter are only retained for a specified length of time. For example, only increments to the counter received within a specified number of minutes are retained. As a result, the counter value only includes increments from item selections within that specified time.

The system calculates the new second probability distribution, $p(s|z)$ (step 510). The system calculates the new second probability distribution as the fraction of counts on an item for a particular category z. More specifically, $$p(s \mid z)_{new} = \frac{\text{counter}(s, z)}{\sum_j \text{counter}(s_j, z)}$$

where the probability of a given item being selected for a particular category is equal to the counter value for the item corresponding to the category divided by the sum of the counter values for the category.

Figure 6:
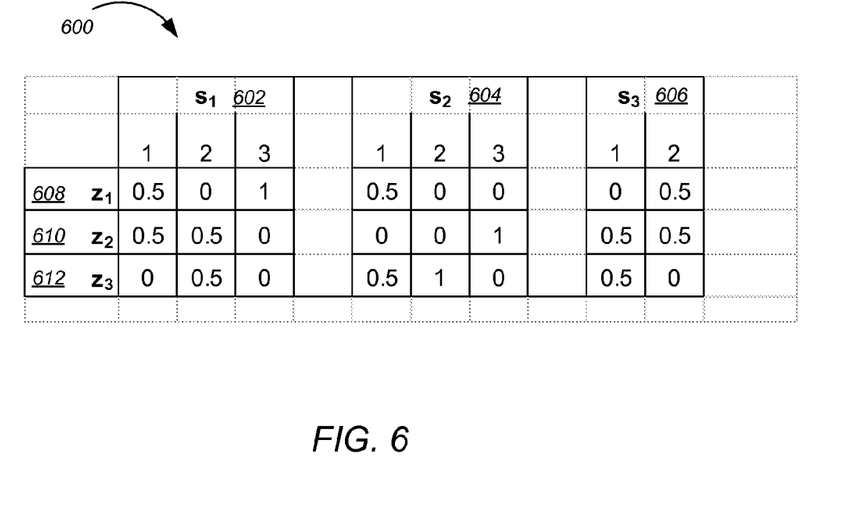
FIG. 6 is a table illustrating counts for items with respect to categories.

FIG. 6 shows an example table 600 illustrating counts for items with respect to categories. In FIG. 6, items $s_1$ 602, $s_2$ 604 and $s_3$ 606 are shown with respect to categories $z_1$ 608, $z_2$ 610, and $z_3$ 612. Each item includes a number of selections of that item. Items $S_1$ 602 and $s_2$ 604 each include three item selections and item $s_3$ 606 includes the selections (i.e., distinct user selections of the item). For each item selection, one or more item counters corresponding to the categories are incremented.

For example, a user corresponding to the first selection of item $S_1$ 602 belongs to categories $z_1$ 608 and $z_2$ 610, but not category $z_3$ 612. Consequently, the count for the item selection is evenly incremented between counters corresponding to category $z_1$ 608 and $z_2$ 610 and the counter of item $S_1$ 602 corresponding to category $z_3$ 612 is not incremented. Similarly, the user corresponding to the third selection of item $S_1$ 602 belongs only to category $z_1$ 608. Thus, the counter for $S_1$ 602 corresponding to category $z_1$ 608 is incremented by 1.

The probability of selecting item $S_1$ 602 given category $z_1$, $p(s_1|z_1)$ is equal to the counter value for the counter of item $S_1$ 602 corresponding to category $z_1$ 608 ($s_1,z_1$=1.5) divided by the sum for category $z_1$ 608 across all items ($s_1,z_1+s_2,z_1+s_3,z_1$=2.5), which is equal to 0.6. Thus, given category $z_1$ 608, a 60% probability is assigned to selecting item $S_1$ 602 over items $s_2$ 604 and $s_3$ 606.

The new second probability distribution, $p(s|z)_{new}$, can be determined at a greater frequency than the first probability distribution, $p(z|u)$, which can generally be considered static relative to the new second probability distribution. As more users select items in the item set, the initial second probability distribution can change. Additionally, weighting the counters with time can also change the initial second probability distribution as time elapses. For example, when the items are news stories, a news story can have a number of user selections when initially added to the item set. However, this can decrease as the news story ages. As a result, when weighting the story according to elapsed time, the decreased likelihood of selecting the news story is reflected by the discounted counter value. Thus, the new second probability distribution can be determined each time a specified amount of time has elapsed.

The new second probability distribution can be determined frequently to account for changes in the item set. In particular, the addition of new items can be captured such that the new second probability distribution includes all the relevant items. Thus, the new second probability distribution can be determined at a frequency that is a function of the rate of item churn. In some implementations, the new second probability distribution is determined in response to an event, for example, receiving a user request for recommended items.

As shown in FIG. 4, the system optionally calculates a new overall probability distribution (step 410). The new overall probability distribution calculated according to the probability distribution model using the first probability distribution and the new second probability distribution. Thus, the new overall probability distribution is described as:

$$p(s \mid u; \theta)_{new} = \sum_{i=1}^{j} p(z_i \mid u) p(s \mid z_i)_{new}$$

where $p(z|u)$ is the first probability distribution retained from the initial probability distribution model described above and where $p(z|u)_{new}$ is the new second probability distribution calculated as described above with respect to FIG. 5.

The system identifies recommended items for a user (step 412). For a given user, the probability distribution model is used to identify one or more recommended items. The new overall probability distribution identifies items having the highest probability of being selected by the user. A specified number of high probability items are identified as recommended items. For example, the items having the ten highest probability values can be identified as the recommended items. In some implementations, the recommended items include a specified number of high probability items for one or more groups of items based on the user's identified interests (e.g., the five highest probability items for each groups). For a user having a known interest in particular groups of items, the recommended items can include items from each of those groups. For example, if the items are news stories, a user can have a specified interest in business and entertainment stories. Consequently, recommended news stories are identified for both business and entertainment groups.

In some implementations, the new second probability distribution is determined each time recommended items are identified for a particular user. Similarly, the new overall probability distribution can be calculated only when recommendations for a particular user are identified. Additionally, the probability distributions can be retained or discarded. The new second probability distribution reflects the current counter values for items with respect to the categories. From clustering information determined from the initial probability distributions, the particular user's membership with respect to different categories is also known. Each item can be assigned a relationship score relating the particular user and each item. The relationship score can be determined according to the user's category membership and the new second probability distribution. Items with a high relationship score for the particular user can be identified as potential recommended items.

The system presents recommended items to the user (step 414). The recommended items can be presented automatically. For example, when a user logs into the system a user interface can present the recommended items. Alternatively, the user interface can include a link to the recommended items. In some implementations, the recommended items are presented to the user in response to a user request for recommended items. The user can choose to select one or more of the recommended items (e.g., view a recommended news story, select a consumer item to purchase).

In some implementations, the recommended items are selected from a set of candidate items. The set of candidate items can be generated, for example, using one or more factors. The factors can include language preferences of the user, item freshness (e.g., how new a news story is), customized groups selected by the user, and structural organization of items (e.g., a particular edition for news items). These factors can be scored or weighted independently from the probability distributions calculated by the recommender system. Alternatively, in another example, the set of candidate items can be generated by examining the union of all items that have been selected by members of the categories that the particular user belongs to and the set of stories that have been covisited with the set of stories in the user's selection history. Covisitation is an event in which two stories are selected by the same user within a specified time interval (e.g., within a few hours). Only items that appear in this set will be candidate items.

Figure 7:
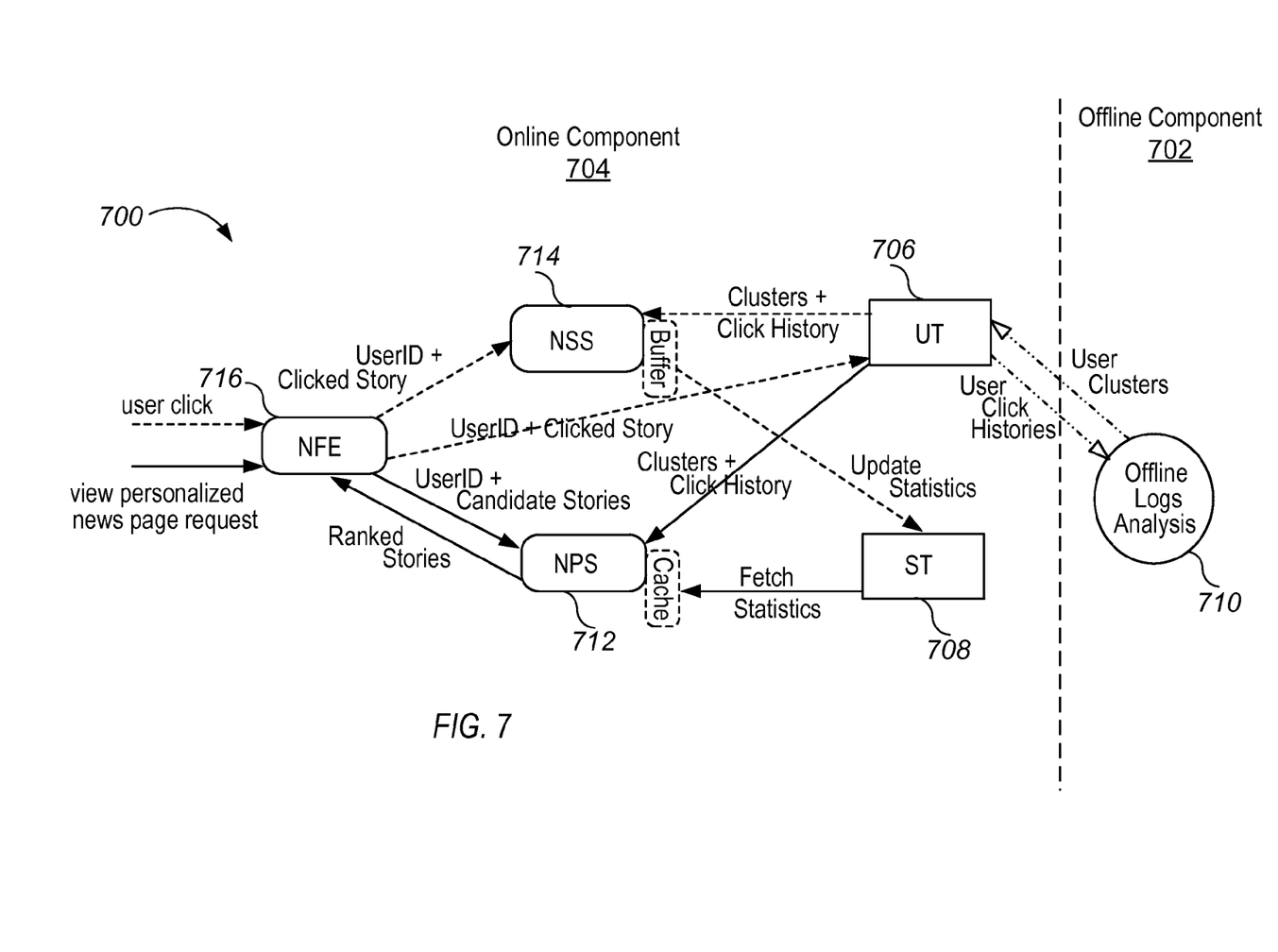
FIG. 7 shows an example recommender system 700.

FIG. 7 shows an example recommender system 700 for recommending news stories to users. Similar systems could be used to recommend other types of items. The system 700 includes an offline component 702 and an online component 704. The offline component 702 includes log analysis 710.

The online component 702 includes a user table 706 and a story table 708, which can be updated e.g., in real-time. The user table 706 includes user event history statistics (e.g., click data relating users and items) and user category statistics. The rows of the user table identify individual users according to distinct user identifiers. The event history identifies each story selected by each user in the user table 706. The category information includes a list of category identifiers that the user belongs to as determined by the probability distribution models.

The story table 708 indexes stories by a story identifier (e.g., each row in the table is an identified story). The story table 708 also maintains two types of statistics: category statistics and covisitation statistics. The statistics can be stored in different columns of the table. The category statistics identify how many times a story was visited by users from each category. As described above, this can be based on the fractional membership of the user in different categories.

The covisitation statistics identify how many times a story s co-visited with each story s'. The covisitation data can be stored, for example, in an adjacency list which is modified when a user selects a story in view to the user's recent story selection history (e.g. selections over the specified time level).

Normalization statistics can be maintained for each of the category and covisitation statistics. For each category, the total number of story selections made by users belonging to that category are maintained. Additionally, for every item, the total number of story covisitation pairs where the story was one of the covisited pair is also maintained. Furthermore, the counts for the selection events can be decayed counts to discount older story selections relative to newer story selections.

The user table 706 and story table 708 can be stored using a Bigtable infrastructure. The Bigtable infrastructure provides a distributed persistent storage system for structured data. The Bigtable is scalable to large amounts of data across a large number of commodity servers. The Bigtable infrastructure is described in Chang et al., "*Bigtable: A Distributed Storage System for Structured Data*," Proceedings of the 7th Symposium on Operating System Design and Implementation, (OSDI 2006), which is incorporated by reference.

Log analysis 710, in the offline component 704, can be periodically performed over user event history data stored on the user table 706. During log analysis 710, selections made by users over a specified time window (e.g., a few months) are analyzed to identify categories for the users according to the probability distribution model described above. The user categories are then stored in the user table 706.

The online component 704 also includes a news statistics server 714, a news personalization server 716, and a news front end 718. The news statistics server 714 updates statistics in the story table 706 when user story selections are reported by the news front end 718. The news front end 718 is, for example, a news webserver though which users interact. The news personalization server 712 provides news story recommendations when requested by the news front end 718 (e.g., in response to user interaction with the news front end 718).

Interactions between the components of the system 700 are shown for two separate types of requests: a recommend request and an update statistics request.

The recommend request work-flow is illustrated by the solid arrows in FIG. 7. When a user requests recommended news stories at the news front end 716, the news front end 716 contacts the news personalization server 712. The news front end 716 sends the user identifier of the user and a list of candidate news stories to be scored. The news personalization server 712 requests user information (category and recent selection history) from the user table 706.

The news personalization server 712 also requests story selection counts corresponding to the category of the user and covisitation counts for the stories in the user's selection history from story table 708. The requested statistics can be locally cached for a specified period of time.

Using the received statistics, the news personalization server 712 calculates recommendation scores (e.g., a category-story score based on the probability distribution model and a story-story covisitation score) that are linearly combined to obtain a final score for each of the candidate stories, which are then sent back to the news front end 716.

The update statistics request work-flow is illustrated by the dashed arrows in FIG. 7. When a user selects a news story, this information is stored in the user's selection history stored in the user table 706. The news front end 716 also contacts the news story server 714 with a request to update any statistics that may changes as a result of the user selection.

In order to update the statistics, the news story server 714 requests the user's information from the user table 706. For every category that the user is a member of, the corresponding count for the category corresponding to the story is updated (and weighted in according to elapsed time as described above). Additionally, the covisitation count for every story in the user's recent selection history is updated with the story corresponding to the user's selection.

These counts along with appropriate normalization counts in the story table 708 are updated by the news story server 714. In some implementations, the news story server buffers the updates and writes them out to the story table 708 periodically.

The following paragraphs describe additional details of the MapReduce programming model and an implementation of the model for processing and generating large data sets. As described above, a MapReduce computation takes a set of input key/value pairs, and produces a set of output key/value pairs. The programmer expresses the computation as two functions: Map and Reduce.

Consider the problem of counting the number of occurrences of each word in a large collection of documents. The programmer would write code similar to the following pseudo-code:

```
map(String key, String value):
    // key: document name
    // value: document contents
    for each word w in value:
        EmitIntermediate(w, "1");
reduce(String key, Iterator values):
    // key: a word
    // values: a list of counts
    int result=0;
    for each v in values:
        result+=ParseInt(v);
    Emit(AsString(result));
```

The map function emits each word plus an associated count of occurrences (just '1' in this simple example). The reduce function sums together all counts emitted for a particular word.

In one implementation, to perform a computation, the programmer writes code to fill in a specification object with the names of the input and output files, and optional tuning parameters. The programmer then invokes a MapReduce function, passing it the specification object. The programmer's code is linked together with the MapReduce library.

Even though the previous pseudo-code is written in terms of string inputs and outputs, conceptually the map and reduce functions supplied by the user have associated types:

map (k1, v1)→list(k2, v2)
reduce (k2, list(v2))→list(v2)

That is, the input keys and values are drawn from a different domain than the output keys and values. Furthermore, the intermediate keys and values are from the same domain as the output keys and values.

Many different implementations of the MapReduce model are possible. More information about MapReduce can be found in J. Dean and S. Ghemawat, *MapReduce: Simplified Data Processing on Large Clusters*, Proceedings of the 6th Symposium on Operating Systems Design and Implementation, pp. 137-150 (Dec. 6, 2004), the contents of which are incorporated here by reference.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
generating an initial overall probability distribution p(s|u) as a combination of an initial first probability distribution p(z|u) and an initial second probability distribution p(s|z), wherein the initial first probability distribution p(z|u) is a probability of a particular category of a plurality of categories given a user of a set of users, wherein the categories are represented by one or more latent variables, and wherein the initial second probability distribution p(s|z) is a probability distribution of a set of items with respect to the one or more latent variables;
calculating an updated second probability distribution $p(s|z)_{new}$ of a current set of items with respect to the one or more latent variables including, wherein the updated second probability distribution is calculated using counter values determined based on prior user selections of items in the set of items and according to user membership in the categories represented by the latent variables, wherein each counter value corresponds to a category of which the user is a member, and wherein each counter value is fractionally incremented relative to other categories of which the user is also a member; and
generating a relationship score for each of one or more items in the current set of items, wherein each relationship score generated for a particular item relates the particular item to relating to a particular user in the set of users based on the particular user's category memberships and the updated second probability distribution.

2. The method of claim 1, further comprising:
calculating an updated overall probability distribution based on the initial first probability distribution and the updated second probability distribution.

3. The method of claim 1, wherein calculating the updated second probability distribution comprises calculating, for each category of the categories, a fraction of counts for an item in the category relative to all of the counter values for items in the particular category.

4. The method of claim 1, wherein the relationship score is used to generate an item recommendation for a particular user.

5. The method of claim 1, wherein determining the counter values comprises determining the counter values based on one or more of the prior user selections that have each been discounted as a function of time.

6. The method of claim 1, further comprising modifying the relationship score for the particular user based on a history of items selected by the particular user within a period of time.

7. The method of claim 1, wherein calculating the updated second probability distribution of the set of items with respect to the latent variables is determined by:

$$p(s|z)_{new} = \frac{\text{counter}(s, z)}{\sum_j \text{counter}(s_j, z)}$$

wherein $p(s|z)_{new}$ is the probability distribution relating items and latent variables, counter (s, z) is a counter value for a particular item s in the category z, and $$\sum_j \text{counter}(s_j, z)$$

is a counter total for all items in the category z.

8. The method of claim 1, wherein a prior selection of an item by a user results in one or more of the counter values being incremented by a total count of 1 distributed as a function of member categories of the user that selected the item.

9. The method of claim 8, wherein the counter values of member categories are incremented according to a first probability distribution relating users and categories.

10. A system comprising:
one or more computer-readable storage media having instructions stored thereon; and
data processing apparatus programmed to execute the instructions to perform operations comprising:
generating an initial overall probability distribution p(s|u) as a combination of an initial first probability distribution p(z|u) and an initial second probability distribution p(s|z), wherein the initial first probability distribution p(z|u) is a probability of a particular category of a plurality of categories given a user of a set of users, wherein the categories are represented by one or more latent variables, and wherein the initial second probability distribution p(s|z) is a probability distribution of a set of items with respect to the one or more latent variables;
calculating an updated second probability distribution $p(s|z)_{new}$ of a current set of items with respect to the one or more latent variables including, wherein the updated second probability distribution is calculated using counter values determined based on prior user selections of items in the set of items and according to user membership in the categories represented by the latent variables, wherein each counter value corresponds to a category of which the user is a member, and wherein each counter value is fractionally incremented relative to other categories of which the user is also a member; and generating a relationship score for each of one or more items in the current set of items, wherein each relationship score generated for a particular item relates the particular item to relating to a particular user in the set of users based on the particular user's category memberships and the updated second probability distribution.

11. The system of claim 10, wherein the data processing apparatus is further programmed to execute instructions to perform operations comprising:
calculating an updated overall probability distribution based on the initial first probability distribution and the updated second probability distribution.

12. The system of claim 10, wherein calculating the updated second probability distribution comprises calculating, for each category of the categories, a fraction of counts for an item in the category relative to all of the counter values for items in the particular category.

13. The system of claim 10, wherein the relationship score is used to generate an item recommendation for a particular user.

14. The system of claim 10, wherein determining the counter values comprises determining the counter values based on one or more of the prior user selections that have each been discounted as a function of time.

15. The system of claim 10, wherein the data processing apparatus is further programmed to execute instructions to perform operations comprising modifying the relationship score for the particular user based on a history of items selected by the particular user within a period of time.

16. The system of claim 10, wherein calculating the updated second probability distribution of the set of items with respect to the latent variables is determined by:

$$p(s|z)_{new} = \frac{counter(s, z)}{\sum_j counter(s_j, z)}$$

wherein $p(s|z)_{new}$ is the probability distribution relating items and latent variables, counter (s, z) is a counter value for a particular item s in the category z, and $$\sum_j counter(s_j, z)$$

is a counter total for all items in the category z.

17. The system of claim 10, wherein a prior selection of an item by a user results in one or more of the counter values being incremented by a total count of 1 distributed as a function of member categories of the user that selected the item.

18. The system of claim 17, wherein the counter values of member categories are incremented according to a first probability distribution relating users and categories.

19. A non-transitory computer-readable medium having instructions stored thereon which, when executed by data processing apparatus, cause the data processing apparatus to perform operations comprising:
generating an initial overall probability distribution p(s|u) as a combination of an initial first probability distribution p(z|u) and an initial second probability distribution p(s|z), wherein the initial first probability distribution p(z|u) is a probability of a particular category of a plurality of categories given a user of a set of users, wherein the categories are represented by one or more latent variables, and wherein the initial second probability distribution p(s|z) is a probability distribution of a set of items with respect to the one or more latent variables;
calculating an updated second probability distribution $p(s|z)_{new}$ of a current set of items with respect to the one or more latent variables including, wherein the updated second probability distribution is calculated using counter values determined based on prior user selections of items in the set of items and according to user membership in the categories represented by the latent variables, wherein each counter value corresponds to a category of which the user is a member, and wherein each counter value is fractionally incremented relative to other categories of which the user is also a member; and
generating a relationship score for each of one or more items in the current set of items, wherein each relationship score generated for a particular item relates the particular item to relating to a particular user in the set of users based on the particular user's category memberships and the updated second probability distribution.

* * * * *